United States Patent [19]

Thornton et al.

[11] Patent Number: 5,073,418

[45] Date of Patent: Dec. 17, 1991

[54] LOW PERMEABILITY FABRIC, AIRBAG MADE OF SAME AND METHOD OF MAKING SAME

[75] Inventors: Peter B. Thornton, Bronxville; Stanley H. Cone; George W. Booz, both of Hornell, all of N.Y.

[73] Assignee: Stern & Stern Industries, Inc., New York, N.Y.

[21] Appl. No.: 565,267

[22] Filed: Aug. 9, 1990

Related U.S. Application Data

[63] Continuation-in-part of Ser. No. 264,158, Oct. 28, 1988, Pat. No. 4,977,016.

[51] Int. Cl.⁵ .............................................. B60R 21/16
[52] U.S. Cl. ...................................... 428/34.9; 28/165; 139/387 R; 139/389; 280/729; 428/225; 428/229; 428/245; 428/252; 38/144
[58] Field of Search .................... 428/34.9, 225, 229, 428/245, 252; 28/165; 280/727, 728, 729; 38/144, 52; 139/387 R, 389

[56] References Cited

U.S. PATENT DOCUMENTS

| | | | |
|---|---|---|---|
| 3,470,928 | 10/1969 | Schwartz | 383/117 |
| 3,705,645 | 12/1972 | Honen | 206/0.6 |
| 3,730,551 | 5/1973 | Sack et al. | 280/743 |
| 3,879,056 | 4/1975 | Hawashima et al. | 280/743 |
| 3,879,057 | 4/1975 | Hawashima et al. | 280/743 |
| 3,892,425 | 7/1975 | Sakairi et al. | 280/743 |
| 3,937,488 | 2/1976 | Wilson et al. | 280/736 |
| 4,225,642 | 9/1980 | Hirakawa | 55/528 |
| 4,872,276 | 10/1989 | Godfrey | 38/144 |
| 4,921,735 | 5/1990 | Bloch | 428/225 |

Primary Examiner—James J. Bell
Attorney, Agent, or Firm—Amster, Rothstein & Ebenstein

[57] ABSTRACT

An airbag includes a bag made of a strong, lightweight, thin, flexible fabric of low permeability comprising an uncoated woven cloth characterized by a permeability of not more than one cubic foot of air per minute per square foot of cloth (0.5 cm³/sec/cm²) at a pressure drop of 0.5 inch of water (1.27 cm) across the cloth. The cloth is calendered on both sides to reduce its permeability. The airbag may additionally include a finish of low thermal conductivity disposed on at least the surface of the cloth forming the interior of the bag.

29 Claims, 3 Drawing Sheets

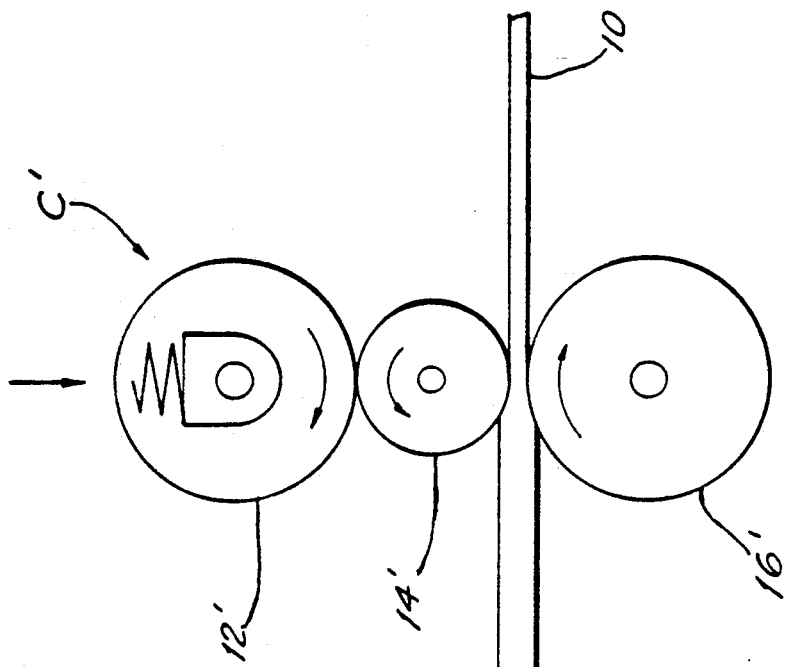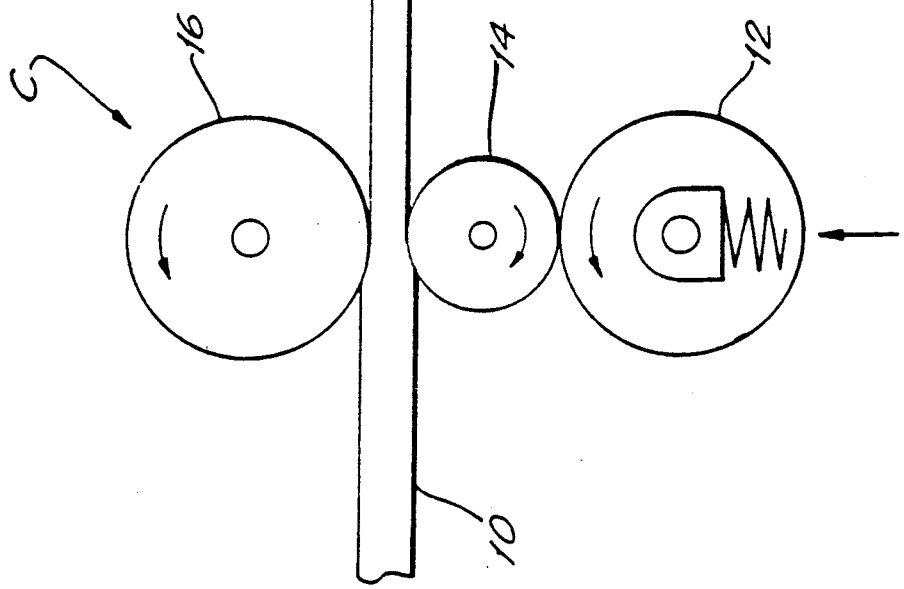
FIG. 1

LOW PERMEABILITY FABRIC, AIRBAG MADE OF SAME AND METHOD OF MAKING SAME

CROSS - REFERENCE TO RELATED APPLICATIONS

This is a continuation in-part of U.S. patent application Ser. No. 264,158, filed Oct. 28, 1988, now U.S. Pat. No. 4,977,016.

BACKGROUND OF THE INVENTION

The present invention relates to a fabric of low permeability suitable for use in an airbag and, more particularly, to such an airbag made of an uncoated woven fabric.

Low permeability fabrics have a multitude of potential uses, e.g., air-filled or water filled mattresses, sleeping bags, pillows, life belts, life boats, chairs, ottomans, etc. Each of these alternative uses may have a different maximum permeability requirement.

Among the most demanding and critical of this multitude of potential uses is their employment in expansible passenger restraint bags for automobiles ("airbags"). The airbags are adapted to be inflated instantaneously with high pressure gas in the event of a collision to prevent the movement of the occupant for safety reasons. For this purpose, the airbag is generally made of an air-impermeable material and formed with an opening from which the high pressure gas introduced into the bag is exhausted, whereby the energy resulting from the occupant's striking against the bag upon a collision and the energy of the subsequent pressing movement are absorbed to reduce the impact. This potentially life-saving use requires that the fabric exhibit not only low permeability, but also be strong, lightweight, thin and flexible so that it can be easily and compactly folded into its appropriate storage container ready for use, withstand the strong shock occurring when it is initially deployed, and add as little weight as possible to the person or vehicle transporting it.

In the past, fabrics intended for use in airbags have been made from a wide variety of materials including macromolecular film (such as polyethylene) and inorganic fibers (such as glass fiber).

Such patents as U.S. Pat. No. 3,705,645 and U.S. Pat. No. 3,892,425 illustrate the conventional manner of forming such fabrics from a woven cloth by coating the cloth with a resin binder to reduce its permeability. Low permeability fabrics for use in airbags are conventionally made of nylon or polyester which has been coated with neoprene, urethane, or silicon resin, even though the coating necessarily increases the weight, thickness (bulk), stiffness, and cost of the cloth while reducing its flexibility, tear strength, over-all strength (due to prolonged exposure to heat during the coating operation) and shelf-life (as the coatings tend to degrade over time). Variations in the coating thickness from lot to lot or within a single lot can also introduce undesirable permeability fluctuations for a given piece of fabric. Further airbags constructed of coated fabrics must include vent holes which must be precisely sized to allow controlled deflation of the bag. The vent holes must be constructed in a manner which avoids stress concentrations and adds considerably to the construction costs of the airbag.

U.S. Pat. No. 3,730,551 discloses a knit or woven nylon or polyester material suitable for use in an airbag, but there is no specific disclosure of the permeability of the fabric or precisely how the fabric is woven (or coated) to provide a suitable permeability according to 1971 standards.

In any case, airbag manufacturers have recently proposed a new and extremely rigorous requirement of low permeability for an uncoated fabric not exceeding one cubic foot of air per minute per square foot of cloth (0.5 $cm^2/sec/cm^2$) at a pressure drop of 0.5 inch of water (1.27 cm) across the cloth (i.e., 1 CFM). In addition, an airbag fabric should be flexible, thin, preferably with a thickness of less than 0.016 inch (0.041 cm), lightweight, preferably with a weight of not more than 8.25 oz/square yard (280 gms/$m^2$), and strong, preferably with a strength characterized by a tensile strength of at least 300 lbs (1334 newtons), a Mullen burst strength of at least 650 psi (4482 kilopascals), and a trapezoid tear of at least 40 lbs. (178 newtons). Preferably the fabric should also be flexible, compactable, have an elongation at break of at least 25%, and exhibit a storage or shelf life of 5 to 10 years without substantial deterioration.

A strong, lightweight, thin, flexible fabric has been sold for use in bomb parachutes as a bomb parachute (for the controlled descent of a bomb, rather than a person), but this fabric was characterized by a permeability of about 1.5-2.0 CFM (specification maximum 3.0 CFM) and thus would not meet the aforenoted extremely low permeability requirement of the proposed new standard for an airbag fabric. Further, the fabric, made of an uncoated, woven nylon calendered on one side to reduce permeability (210/34/0 multifilament yarn woven in a 1×2 modified Oxford weave, 80 ends/inch×80 picks/inch), exhibited low flexibility and insufficient tear strength.

Thus, the need remains for a fabric which is strong, lightweight, thin and flexible, yet of extremely low permeability.

Accordingly, it is an object of the present invention to provide a strong, lightweight, thin, flexible fabric having a permeability of not more than 1 CFM.

Another object is to provide such a fabric which is suitable for use in airbags.

A further object is to provide a method of making such a fabric or a similar one having a permeability of not more than 3 CFM.

It is also an object to provide an airbag made of such a fabric.

It is a further object to provide an airbag made of such fabric which can be constructed without vent holes yet retains the ability to deflate rapidly.

SUMMARY OF THE INVENTION

It has now been found that the above and related objects of the present invention are obtained in a strong, lightweight, thin, flexible fabric of low permeability comprising an uncoated woven cloth characterized by a permeability of not more than one cubic foot of air per minute per square foot of cloth (0.5 $cm^3/sec/cm^2$) at a pressure drop of 0.5 inch of water (1.27 cm) across the cloth (i.e., 1 CFM). Preferably the fabric is further characterized by a Mullen burst strength of at least 650 psi (4482 kilopascals), a tensile strength of at least 300 lbs. (1334 newtons), a trapezoid tear of at least 40 lbs. (178 newtons), an elongation at break of at least 25%, a weight of not more than 8.25 oz/square yard (280 gm/$m^2$), and a thickness of less than 0.016 inch (0.041 cm).

In a preferred embodiment, the cloth is polyester and woven in a plain or basket weave, preferably a 1×1 plain or 2×2 basket weave. The cloth is woven about 48 ends/inch by about 48 picks/inch (19 ends/cm by 19 picks/cm). The cloth is woven of not greater than 600 denier multifilament yarn, preferably 400-600 denier multifilament yarn, having 100-300 filaments.

The low permeability is achieved by calendering the cloth on both sides.

The invention also encompasses a method of making such a fabric by providing an uncoated, woven, strong, lightweight, thin, flexible cloth of high permeability. Then the cloth is calendered on both sides to reduce the permeability to not more than 3 CFM, preferably to not more than 1 CFM.

In a preferred embodiment the cloth is calendered in a calender exerting a pressure of 65-75 psi (448-517 kilopascals) at a temperature of about 350°-370° F. (177°-188° C.), preferably a calender exerting a pressure of 70 psi (483 kilopascals) at a temperature of about 360° F. (182° C). Thus the cloth may be calendered in a calender exerting 65-80 tons/70 inch base ($59.0-72.6 \times 10^6$ gm/178 cm) at a nominal nip of 0.5 inch (1.27 cm) at a temperature of 350°-370° F. (177°-188° C.), preferably a calender exerting about 70 tons ($63.5 \times 10^3$ kilograms) at a temperature of about 360° F. (182° C.).

The invention further encompasses the fabric produced by the method.

Still further, the invention encompasses an airbag including a bag made of the fabric and a method of making the airbag. Additionally, an airbag made of the fabric can be constructed without vent holes thereby simplifying design and construction costs.

Finally, the invention further encompasses the fabric and an airbag made of the fabric wherein the fabric is formed of the uncoated woven cloth of low permeability and a finish disposed on at least the surface of the cloth forming the interior of the bag to reduce flash point melting of the cloth. The finish may be an additive added to the yarn prior to weaving of the cloth or an additive added to the cloth after weaving thereof. The finish is preferably a processing lubricant (or oil), such as a blend of mineral oil and at least one non ionic surfactant. The finish either has a low thermal conductivity or contains volatiles, or both.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein:

FIG. 1 is a schematic view of the cloth passing through a calender which calenders both sides of the cloth, according to the method of the present invention;

DETAILED DESCRIPTION OF THE PREFERRED EMBODIMENTS

Figure 2:
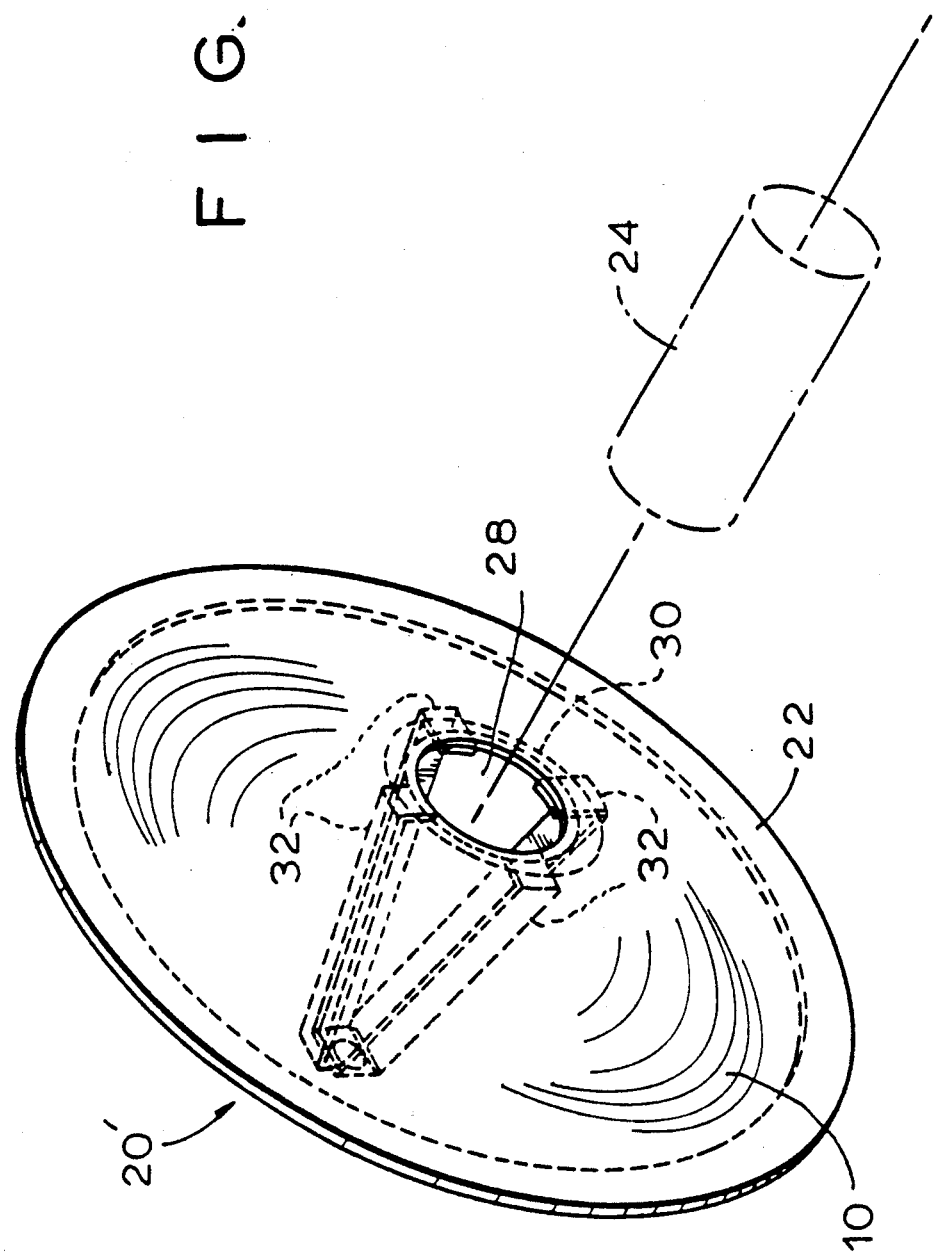
FIG. 2 is an isometric view of an airbag according to the present invention, with an inflater therefor shown in phantom line.

One aspect of the present invention comprises a strong, lightweight, thin, flexible fabric of low permeability comprising an uncoated woven cloth characterized by a permeability of not more than one cubic foot of air per minute per square foot of cloth (0.5 $cm^2/sec/cm^2$) at a pressure drop of 0.5 inch of water (1.27 cm) across the cloth (hereinafter CFM).

The level of low permeability required in the fabric will vary according to the requirement of a particular manufacturer for a given application. In the past it has been exceedingly difficult to reliably and consistently obtain low permeability in uncoated fabrics and, accordingly, a permeability of less than 3 CFM has been considered to be "zero" permeability but has been insufficient to meet the airbag manufacturer's requirements. On the other hand, the proposed new standards for uncoated airbag fabrics require a permeability of not more than 1 CFM, a standard which must be met uniformly and consistently both throughout a batch and from batch to batch over time.

The strength of the fabric is a composite of its Mullen burst strength, its tensile strength and its trapezoid tear strength. More particularly, its Mullen burst strength is at least 650 psi (4482 kilopascals), its tensile strength is at least 300 lbs. (1334 newtons), and its trapezoid tear strength is at least 40 lbs. (178 newtons). Preferably its elongation at break is at least 25%. The high strength characteristic of the fabric is an essential characteristic of a fabric intended for use in an airbag where the airbag must be able to withstand the initial shock of an explosive inflation and immediately thereafter the impact of someone hitting it as the passengers are thrown forward. It must withstand these forces without bursting, tearing or stretching to the point where the airbag no longer serves its protective function and it must deflate rapidly.

To be suitable for use in airbags, the fabric must also be lightweight, thin and flexible as the airbag formed of the fabric must be capable of being folded and compacted so as to fit within an extremely limited volume, such as that available within the steering column or about the already crowded dashboard panel in front of the passenger. As a practical matter, the fabric must also be lightweight so that the airbag does not contribute unnecessarily to the weight of the car, thereby reducing mileage. Thus the weight of the fabric is not more than 8.25 ounces per square yard (280 $gm/m^2$), and the thickness is less than 0.016 inch (0.041 cm).

The properties of the fabric discussed herein are determined by Federal Test Method Standard No. 191A and, in particular, for permeability Method 5450, for burst strength Method 5122, for tensile strength and elongation, Method 5100 Grab, for tear strength Method 5136, for weight Method 5041, and for thickness Method 5030.

According to the present invention, the fabric is preferably formed of nylon or polyester yarn, with polyester yarn being preferred over nylon yarn for reasons unique to the present invention as will be explained hereinafter. Other thermoplastic yarn may be used for particular applications.

The cloth is woven of multifilament yarn not greater than 600 denier, and preferably 400-600 denier, 100-300 filaments per yarn bundle. Lower denier yarns provide lightness and thinness, but afford less strength and are more expensive as more yarn and more weaving is required to provide the same coverage. Higher denier yarn tends to produce a heavier and thicker fabric which is harder to fold and makes control of the permeability during the manufacturing process difficult, especially during the manufacturing process of the present invention as will be explained hereinafter. More particularly, the warp yarn is preferably 440/100/3 ¼ Z (that is, 440 denier, 100 filaments per yarn bundle, 3¼ turns per inch of yarn with a counter-clockwise twist), and the fill yarn is preferably 440/100/0 (that is, 440 denier, 100 filaments per yarn bundle, with a zero or "producer's" twist). A minimum of 100 filaments per yarn bundle is preferred.

In order to enhance the flexibility of the woven cloth, the cloth is woven in a basket weave, preferably a 2×2 basket weave. It will be appreciated that the use of a basket weave, and in particular a 2×2 basket weave, increases the permeability of the cloth. Nonetheless, the processing of the cloth according to the present invention so decreases its permeability as to enable use of the 2×2 basket weave while still enabling the cloth to meet the low permeability requirement. As the forces exerted on the fabric may be in any direction, it is preferred to use a weave which provides a balanced count for balanced strength extending in the warp and fill directions, such as a basket weave (as opposed to an Oxford weave). Other weaves may be employed instead of a basket weave—e.g., a 1×plain weave or a 2/1 twill weave. A 1×1 plain weave is naturally tighter than a 2×2 basket weave and thus provides an even lower permeability. Furthermore, the seam slippage is decreased so that there is less windowing or opening of the seam during inflation, thereby improving the dynamic permeability of the fabric. While the 1×1 plain weave is naturally stiffer than a 2×2 basket weave, it has been found to be thinner by about 20%. The increased thinness compensates for the increased tightness so that the two weaves afford generally comparable compactability.

The cloth is preferably woven, for a 2×2 basket weave, about 52 ends/inch (20.5 ends/cm) and 52 picks/inch (20.5 picks/cm) to provide a desirable tightness of the weave, although greater and fewer picks and ends per inch may be used. (About 48 ends/inch and 48 picks/inch are suitable for a 1×1 plain weave.) The optimum end and pick count will depend to a large degree upon the thickness (i.e., denier) of the yarn. For thick 600 denier yarn, the end and pick count may be as much as 33% less. For thin 400 denier yarn, a variation of ±5% in end and pick count is acceptable. The tighter the weave (that is, the higher the end and pick count) the less permeable the cloth; on the other hand, the looser the weave (that is, the lower the end and pick count), the less expensive the cloth in terms of both yarn material and weaving costs).

The desired low permeability of the fabric of the present invention is achieved by calendering the uncoated woven cloth on both sides thereof to reduce its permeability while at the same time retaining its desirable characteristics of high strength, lightweight, thinness, and flexibility. While the calendering operation will be discussed hereinbelow in terms of reducing the permeability to not more than 1 CFM, clearly the parameters of the same calendering operation can be adjusted to provide a fabric having any permeability of not more than 3 CFM. It is believed that the calendering operation replasticizes the thermoplastic material of the woven cloth and squashes and flattens the high points on both sides of the fabric to block the permeability-providing interstices. The calendering operation produces a glossy sheen on the calendered side of the fabric, so that a fabric which has been calendered on both sides is easily distinguishable from uncalendered fabric or fabric which has been calendered on only one side.

Calendering of the cloth on both sides thereof may be performed in a number of different ways depending on such factors as the number of available existing calenders, the willingness to create specialized calendering equipment, the desirability of continuous versus batch operation, and the like. As in a standard calendering operation, prior to calendering the cloth is typically scoured to clean the same (with detergent, anti-bacterial or anti fungal ingredients, dyes and other conventional materials added, as desired), and then dried and heat set in a tenter oven (for example, at 250° F.) In order to exert pressure on the cloth as it passes through the calender, the cloth is insulated from the pressure roll (typically made of steel) by a cushioning roll (typically a steel roll having a number of coaxial disks of cotton paper thereabout). The hot roll (typically made of steel) on the other side of the cloth is heated to about 350°-370° F., for example, by hot oil flowing therethrough. In order to perform the second calendering operation—that is, the calendering of the opposite side of the cloth—in a batch process, the cloth may be inverted (to exchange sides) and passed through the same calendar a second time. Alternatively, in a continuous process, the cloth may be passed through an inverted second calender—that is, a calender having the pressure and cushioning roll combination interchanged with the hot roll.

Referring now to the drawing, and in particular to FIG. 1 thereof, therein illustrated is a continuous process for the calendering of cloth on both sides according to the present invention The scoured and dried cloth 10 emerging from a tenter oven (not shown) passes through a conventional calender generally designated C including a pressure roll 12 bearing upwardly on a cushioning roll 14 in turn bearing upwardly on the bottom cloth surface, with a hot roll 16 bearing downwardly on the upper cloth surface. Subsequently the cloth 10, now calendered on the bottom surface, passes through an inverted calender generally designated C' including a pressure roll 12' bearing downwardly on a cushioning roll 14' in turn bearing downwardly on the upper cloth surface, with a hot roll 16' bearing upwardly on the bottom cloth surface. The resultant cloth is calendered on both its top and bottom surfaces.

It will be appreciated that the two calendering operations can be performed using a single modified calendar having, for example, a cushioning roll and a hot pressure roll on each side of the cushioning roll. The cloth would pass initially between the cushioning roll and the first hot pressure roll and then, after being twisted so that the calendered cloth surface which was adjacent the cushioning roll is now remote from the cushioning roll, loop back between the cushioning roll and the second hot pressure roll.

Preferably the calenders exert a pressure of 65-75 psi (448-517 kilopascals) at a temperature of 350°-370° F. (177°-188° C.). A pressure of about 70 psi (483 kilopascals) and a temperature of about 360° F. (182° C.) are preferred. Typically higher pressures are utilized in connection with lower temperatures, and lower pressures are utilized in conjunction with higher temperatures. For example, the calender may exert a pressure of 65-80 tons per 70 inches of base (59.0-72.6×10³ kilograms for a 178 cm base) at a nominal nip of 0.5 inch (1.27 cm), preferably about 70 tons (63.5×10³ kilograms).

Where substantially higher calendering pressures are utilized, the low permeability is obtained only at the cost of the strength of the fabric which in effect becomes a plain sheet of plastic lacking the strength of a woven. Where the calendering pressure is substantially lower, the calendering operation fails to squash and flatten the high spots of the cloth as necessary to achieve low permeability.

As each calendering operation subjects the cloth to an elevated temperature for only a short duration (e.g., approximately one second), the cloth is not thermally degraded as it is during a coating operation, where the exposure of the cloth to an elevated temperature is prolonged.

It is theorized that the calendering operation to a limited degree replasticizes the thermoplastic material of the woven cloth and mashes down the hills or high spots of the woven cloth, thereby to close the adjacent interstices and so reduce the overall permeability of the cloth. Calendering on both sides of the cloth is essential as apparently calendering on one side only does not effect blockage of each interstice (even when calendered twice on that side) while calendering on both sides substantially reduces and almost eliminates the number of unblocked interstices. Alternatively, it is possible that calendering on one side only, while affecting substantially all interstices, fails to provide 100% blocking of each interstice, and the calendering on the opposite side provides the additional blockage of each interstice necessary to substantially reduce the permeability of the cloth. Indeed, the reason why it is preferred that the yarn of the present invention have a denier not exceeding 600, and preferably not exceeding 500, is that higher denier yarns have high spots which are difficult to mash down.

The reason why polyester cloth is preferred over nylon cloth in the present invention is that polyester retains its low permeability over an extended period of time (such as the 5 to 10 years of life which may be required for an automobile airbag). It will be appreciated that in a conventional airbag fabric where reduced permeability is obtained by coating, nylon remains a preferred material for a variety of reasons including ease of coating. On the other hand, in the fabric of the present invention where an uncoated fabric achieves low permeability through calendering, the polyester fabric affords enhanced longevity. It is theorized that the superiority of polyester over nylon for the purpose of the present invention arises out of its lower moisture regain properties. Both nylon and polyester are hydrophobic fibers, and both are thoroughly dried in the tenter oven prior to calendering. Over a period of time after calendering (during the 5–10 year anticipated lifetime of the airbag), the nylon fabric will exhibit a higher moisture regain (about 4.5%) relative to the polyester (about 0.4%). As the nylon fabric regains moisture, it also tends to resume its original woven configuration, with the one-time hills crushed by the calendering operation into or over the interstices departing the interstices and resuming their prior orientation, thus allowing a return to a higher permeability. Further, while the nylon fabric may initially exhibit a higher tensile strength (175–183 lbs.) than the polyester fabric (148 lbs.), after oven aging at 300° F. for 68 hours the nylon fabric tensile strength degrades sharply (to 83–87 lbs.) while the polyester fabric tensile strength remains substantially constant (at 148 lbs.).

The present invention encompasses not only the strong, lightweight, thin, flexible fabric 10 of low permeability described hereinabove, but also an airbag including a bag formed of such fabric. Referring now to FIG. 2, therein illustrated is such an airbag, generally designated 20. The airbag 20 is of conventional configuration and dimensions and includes as the basic components thereof a bag 22 formed of the calendered fabric 10 and an inflator 24 for producing the gases which inflate the bag 22 in the event of a collision. The bag 22 is formed by two pieces of the fabric 10 secured together by peripheral stitching 26, preferably using nylon or polyester thread. One of the two pieces of fabric defines a central aperture 28, which functions as an inflator opening providing communication between the inflator 24 and the interior of bag 22. The inflator opening 28 is typically surrounded by one or more fabric reinforcing rings 30 sewed to the one piece of fabric. The inflator 24 is fastened to the bag 22 in the area of reinforcing rings 30, for example, by stitching, with the exhaust outlet of the inflator 24 being aligned with the inflator opening 28 of the bag 22. Four equidistantly spaced tethers 32 are shown, sewn at one end to the reinforcing rings 30 and at the other end to the opposed end of the bag 22, although some airbags do not require tethers. As passive passenger restraint systems involving airbags are well-known, it is not deemed necessary to set forth further details thereof herein.

It was noted, after the deployment of the airbags, that the hot deployment gases (that is, the gases produced by the initiator) had sought the path of least resistance—namely, through needleholes or otherwise stressed fabric areas —and caused minor but noticeable melting of the bag in these areas. The minor melting—called "flash point melting"—is objectionable from at least the cosmetic standpoint and possibly from the reliability standpoint because it at least suggests the possibility of actual bag failure. The minor melting concentrates about the sewing needleholes at the periphery of the bag, sometimes producing melting of the base fabric.

At the present time initiators of two general types are used: the more conventional initiator which produces hot gases combined with gritty particulate matter formed during the inflation process and cooler, cleaner initiators. The melting problem is greatly reduced when cooler, clean inflators are used, but appears primarily when hot, dirty inflators are used, the latter producing hot, gritty emissions at an elevated temperature. In a hot, dirty inflator, such as a high burn rate sodium azide inflator, the gases and the gritty emissions of copper compounds are emitted at about 1,000° F. in the vicinity of the inflator opening. While it is clear that the gases cool to something less than that as gases expand towards the fabric of the bag, the temperature of the gases at the time they reach the fabric surface is not known.

The melting point for nylon 66 and polyester in about 484° F., and the gases must be at least at that temperature or they would not be able to cause the noticed melting. As these are the preferred polymers for use in an airbag, and neither polymer is commercially available in a higher melting point form, and as there exist commercially sound reasons for using a hot, dirty inflator (such as the common sodium azide inflator), the dilemma appeared insoluble. Thus, the present invention also encompasses a solution to the dilemma consisting of an improved fabric and an airbag comprising a bag made of the improved fabric.

Figure 3:
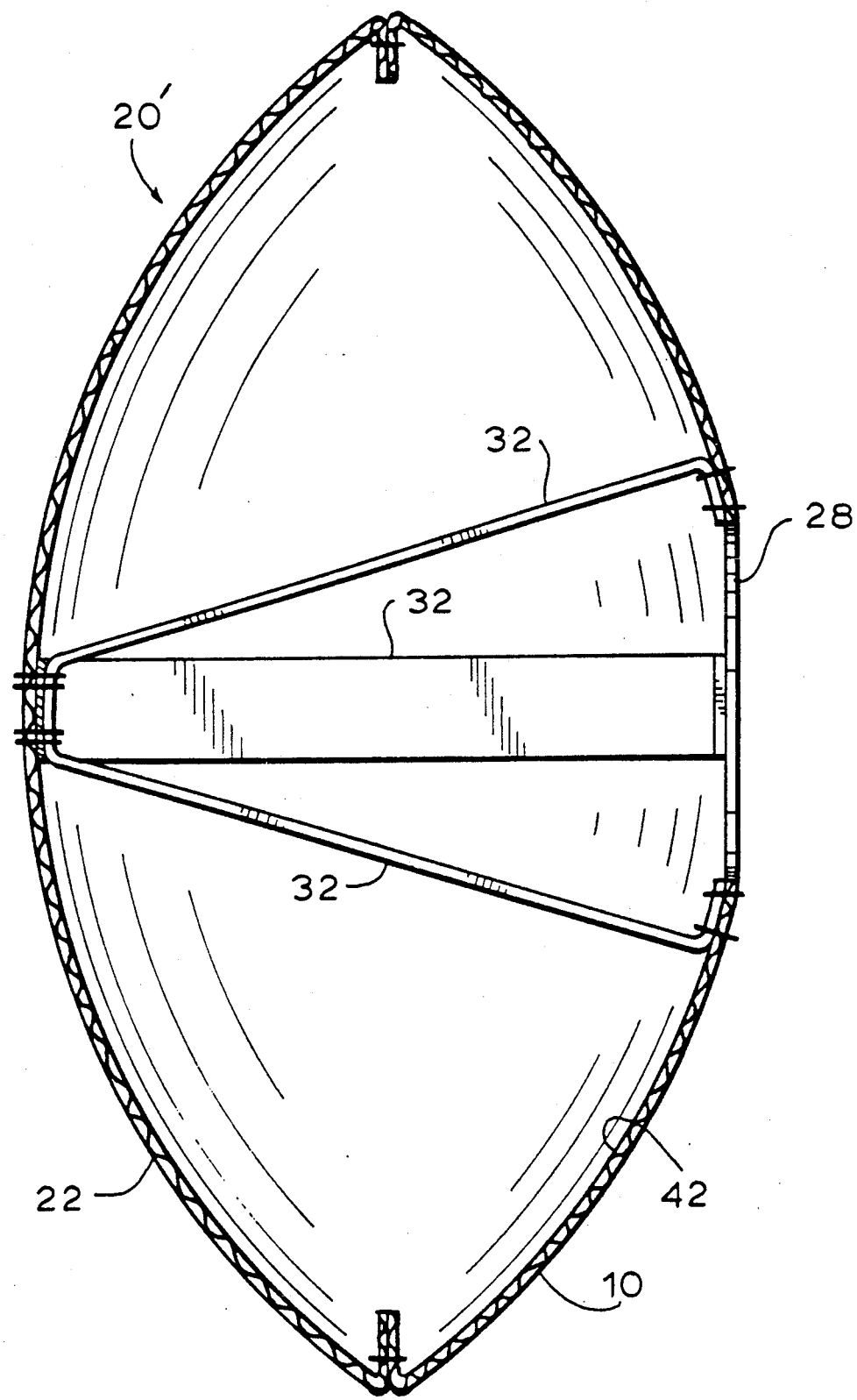
FIG. 3 is a sectional view of an airbag inflated according to the present invention made from a fabric having a finish.

Referring now to FIG. 3, therein illustrated is an airbag according to the present invention, generally designated 20', in which the fabric 10 of the bag 22 is formed of the uncoated woven cloth of low permeability, as discussed hereinabove, but having a finish 42 disposed on at least the surface of the fabric 10 forming the interior of the bag 22. As the entire inflation process is completed within about 1/10 of a second, the finish 42 protects the fabric 10 by delaying the heat transfer and absorbing a certain amount of the heat energy required either to raise the temperature of the finish or to melt and volatilize it.

Finish treatments differ from coatings in that they do not significantly alter the drape or hand, weight, or permeability of the base fabric, nor prevent the individual yarns or fibers from being separated out after the treatment is applied. Common examples of surface or finish treatments are fire retardants (ammonium salts, phosphate ions), dyes, soil and/or water repellents (such as Dupont's Zepel), static resists, antibacterials, mildew resists (metal salts and soaps, and sizings), yarn sizes, starches, and bonding agents applied prior to coating. They may be considered permanent or renewable with respect to one or another solvent (such as water or dry cleaning fluid.) (See *Elements of Textiles*, by Jules Labarthe, 1975, Macmillan Publishing, esp. pp. 301–305.) Solvent durability is not a concern of the present invention since an airbag is sealed and used only once. The primary concerns of the present invention are durability at elevated temperatures (e.g., 108° C.) over prolonged periods (e.g., 10 years), and conformance with FMVSS 302 for flammability.

FMVSS 302 is the Federal (Department of Transportation) Motor Vehicle Safety Standard—Flammability of Interior Materials (published in the Federal Register of Dec. 2, 1971). The test requires that material should not burn or transmit a flame across its surface at a rate of more than four inches per minute. However, if the material stops burning before it has burned for 60 seconds from the start of timing and it has not burned more than two inches from the point where timing was started, it shall be considered to meet the requirement. The improved fabric of the present invention met the requirement because it ignited, but self extinguished before entering the timing zone. The improved fabric also met the heat aging requirement (an elevated temperature of 108° C. equivalent a period of 10 years).

A preferred finish 42 for the purpose of the present invention is a fluoropolymer dispersion (approximately 50% perfluoroalkylmethacrylate copolymer mixture and 50% polyalkylmethacrylate copolymer mixture) available under the trade name Zepel B from Dupont and designated as a water, oil and stain repellent finish. The flash point of Zepel is listed as 133° F. (56° C.). Typically a 10% weight add-on is applied to the fabric. Zepel may be applied to the calendered fabric by passing the fabric through a ringer, preferably in a double dip operation, followed by a drying operation and a final curing operation to cure the Zepel. In the double dip operation, the fabric is passed through the solution under one submerged roller, over a second roller (not submerged), under a second submerged roller, and finally through a squeeze roller system to "wring" out the excess material. The double dip process enables achievement of the 10% level desired on the fabric. Zepel creates a barrier around each of the filaments by curing around the fibers after the water and solvent have been expelled. Zepel on the fabric is inert; it does not react with the fabric chemically. It is hypothesized that, because of the non volatile nature of the Zepel finish, Zepel B is successful in delaying melting of the fiber during deployment of the bag because the barrier created by the finish slows the temperature increase of the fabric.

Zepel is typical of finish treatments which cannot be applied prior to calendering with a paper calender roll because of the potential for contamination of the paper calender roll during subsequent processing of the fabric. Accordingly, a Zepel or similar finish treatment performed after calendering requires additional processing steps for the fabric—namely, drying and curing of the Zepel. As a result, the fabric is exposed to greater heat, tends to shrink more, and hence gets denser. Furthermore, the permeability increases slightly, although it is still less than the desired 1.0 CFM. Accordingly, if a Zepel or similar finish treatment is used, it may be desirable to use a steel calender roll rather than a paper calender roll, so that the Zepel can be applied prior to calendering and the calender roll thereafter cleaned to remove any transfer of the Zepel or similar finish. The use of a steel calender is not, however, always desirable.

While the application of a Zepel finish is effective to prevent melting, the Zepel treatment represents an added cost in terms of both material and processing to apply the finish. Surprisingly, it has been found that equal or better results can be obtained at no extra cost not by adding a finish for the purpose of avoiding melting, but simply by omitting a conventional step in the manufacture of the fabric.

During manufacture of a yarn for weaving, a processing oil is customarily applied to the yarn by the yarn manufacturer as a lubricant in order to facilitate subsequent weaving of the yarn. While different suppliers and manufacturers utilize different finishes, generally the finishes are applied at such a low level (generally less than 1% by weight add-on to the fabric) that the finish has little, if any, effect on the heat resistance of the fabric.

During the subsequent manufacture of the fabric or cloth from the yarn, however, the fabric manufacturer typically applies a processing oil to at least the warp yarn, but then scours the fabric produced to remove the processing oils prior to the conventional heat setting operation. According to a preferred embodiment of the present invention, the fabric produced by the fabric manufacturer is not scoured prior to the heat setting operation, so that the processing oils present on the woven fabric remain there and are incorporated into the final fabric as a finish to retard flash point melting.

The use of these processing oils does not increase the cost of manufacture of the fabric because the processing oils are applied for other purposes in any case (i.e., as a lubricant), and, in fact, may lower the cost of manufacture because the scouring and drying operations are no longer required. Thus, the finish treatment of the present invention using processing oil as a finish is effective to prevent the flash point melting without increasing the cost of the fabric or deleteriously affecting the other properties of the fabric in any significant way. In addition to the aforementioned economic advantages of using processing oil as the finish, because their use enables the last operation performed on the fabric to be calendering, a minimum permeability is obtained for the calendered fabric. Indeed, the primary disadvantage of the use of the processing oil finish treatment is that the fabric must be produced and maintained in a very clean condition prior to heat setting, so that any process dirt or grease that happens to fall on the fabric is not heat-set into the fabric. The elimination of the scouring step in order to retain the processing oils also eliminates the ability of the manufacturer to clean the fabric of any process dirt or grease, which might accumulate on the fabric.

While various different processing oils may be used, a blend of 90% by weight mineral oil and 10% non ionic surfactants, such as the blend available under the trade name Knit Lube PL-516 from Milliken Chemical Company, is preferred. The volatile properties of the Knit Lube PL-516 are: Smoke Point: 240° F. (the point at which volatiles are driven off); Flash Point: 345° F. (the point at which vapors can ignite when exposed to open flame); and Flame Point: 390° F. (the point at which the liquid can burn when exposed to open flame). It is hypothesized that Knit Lube PL-516 is successful in delaying melting of the fiber during deployment of the bag because the finish emits volatiles at a low temperature, thereby helping to slow the temperature increase (similar to evaporation cooling).

A level of about 6% by weight add-on of processing oil, based on the fabric, is applied to the warp yarn. While it is only necessary for the finish to be applied to the surface of the fabric which will be exposed to the hot gases and hot particles during deployment (i.e., the inner surface of the bag), for ease of manufacturing the fabric it may be applied to both surfaces (i.e., the inner and outer surfaces of the bag.) The fabric contains about 0.92% by weight extractible processing oil in the greige or unfinished state, about 0.08% in the finished state (heat set, but not scoured), and about 0.20% in the deployed bag (this figure being unreliable as the deployed bag is contaminated with residue from the deployment). The twisting of the yarn results in embedding of the oil into the bundle for better retention thereof.

Alternative processing oils (or lubricants) include Barbalube 50 (90% mineral oil/10% surfactants) available from Apollo Chemical Corporation of Burlington, N.C.; Isafil 570C (90% mineral oil/10% surfactants) available from Boehme Filatex Inc. of Reidsville, N.C.; DR85 (90% mineral oil/10% surfactants) available from Nonfluid Oil Corp. of Newark, N.J.; and Stantex 5283 (85-90% mineral oil/10-15% surfactants) available from Henkel Corp. of Charlotte, N.C.

EXAMPLES

EXAMPLE I

The following example illustrates the relative effects of calendering both sides of a fabric, relative to calendering only one side of the fabric.

A test cloth had a warp of 440/100/3 ½ Z yarn and a fill of 440/100/0 yarn. The cloth was a 2×2 basket weave.

Calendering was performed at a pressure of 70 psi and 360° F. for each run. One sample of the fabric was calendered twice on one side, and other sample of the fabric was calendered once on each side. Permeability of the fabric was measured before any calendering operation, after the first calendering operation, and after the second calendering operation. The resultant permeabilities of the fabric samples are indicated in the Table.

TABLE

| | Calendering Same Side, CFM | Calendering Opposite Sides, CFM |
|---|---|---|
| Before Calendering | 24.20 | 22.90 |
| After 1st Calendering | 1.82 | 1.63 |
| After 2nd Calendering | 1.42 | 0.62 |

Thus, calendering on one side produced a very substantial lessening of permeability. While a second calendering on that one side afforded a further small decrement in permeability, a second calendering on the other side of the fabric produced a substantial decrease in permeability, one sufficient to reduce the permeability below the 1 CFM level. In other words, when calendering is performed on opposite sides of the fabric, the second calendering is more effective than when calendering is performed twice on the same side of the fabric. This is true both in terms of the absolute and relative decreases in permeability resulting from the second calendering operation. In absolute terms, the second calendering operation (on the opposite side) produced a decrease in permeability which was 2½ times that produced when calendering was performed twice on the same side; in relative terms (as a percentage of the permeability remaining after the first calendering operation), the decrease in permeability was almost three times greater.

After calendering on opposite sides, the cloth had 54 ends per inch and 51 picks per inch, and had a Mullen burst strength of 905 psi, a tensile strength of 548-558 lbs., a trapezoid tear strength of 208-372 lbs., an elongation at break of 38-50%, a weight of 7.22 oz./square yard and a thickness of 0.010 inch.

By way of comparison, a 1×1 plain polyester weave cloth of similar yarns had, after similar calendering on both sides, 51 ends per inch and 43 picks per inch and had a permeability of 0.21 CFM. The cloth had a Mullen burst strength of 825 psi, a tensile strength of 494-552 lbs., a trapezoid tear strength of 64-108 lbs., an elongation at break of 36-37%, a weight of 6.29 oz./square yard and a thickness of 0.0078 inch.

EXAMPLE II

To compare the effect of a finish treatment on preventing flash point melting, three substantially similar polyester samples A, B, C were each heat set and calendered according to the present invention. Sample A served as a control and was conventionally scoured, dried, heat set and calendered. Sample B was conventionally heat-set and calendered without any scouring occurring. Sample C was conventionally scoured, dried, heat set and calendered (like Sample A), but then treated with Zepel. Airbags made from the various samples were ignited using a sodium azide inflator, with each bag then being checked for flash point melting about the sewing holes. While the bag made from the control fabric (Sample A) evidenced melting about the sewing holes, no melting was observed in the other samples (Samples B and C). Each of the fabrics met the requirements of FMVSS 302 and passed a heat aging test (108° C.).

The particulars of each sample and the processing thereof are set forth below:
Sample A: Scoured, Heat-Set and Calendered (Control)
Count: 47 warp/inch×47 fill/inch
Weight: 6.07 oz./sq. yd.

Scour: 190° F. with non ionic detergent at a pH of 7-8 for 14 passes.
Dry: Tenter Frame at 300° F., 20 YPM (yards per minute)
Heat Set: Relaxed condition 400° F., 10 second exposure
Calender: 300° F., 70 tons of pressure, 25 YPM, each side
Permeability: 0.15 CFM
Melting: Yes
Sample B: Heat Set and Calendered (Without Scouring)
Count: 48×47
Weight: 6.35 oz.
Scour: None
Dry: None
Heat Set: Tenter Frame at 350° F., 20 YPM Relaxed condition 425° F., 10 second exposure
Calender: 300° F., 70 tons of pressure, 25 YPM, each side
Permeability: 0.25 CFM
Melting: None observed
Sample C: Zepel Treated
Count: 47×48
Weight: 6.44 oz.
Scour: 190° F. with non-ionic detergent at a pH of 6-7 for 14 passes
Dry: Tenter Frame at 300° F., 20 YPM
Heat Set: Relaxed condition 400° F., 10 second exposure
Calender: 300° F., 70 tons of pressure, 25 YPM, each side
Wringer: Run double dip through Zepel
Dry Finish: 300° F., 25 YPM
Cure Finish: 350° F., 25 YPM
Permeability: 0.68 CFM
Melting: None observed It will be appreciated that the finish applied to the fabric in the preferred embodiments of the present invention is either of low thermal conductivity (such as Zepel) so as to slow the heat transfer from the hot gas and hot particles to the fabric or contains volatiles (such as Knit Lube PL-516) which melt and vaporize at a temperature below the melting point of the fabric and thus cool the hot gases and hot particles before they contact the fabric, by the combined heat of melting and heat of evaporation of the volatiles. Depending upon the specific finish used, either one or both of these mechanisms may be operative to provide the desired protection of the fabric from the hot gases and hot particles generated during deployment of the airbag. The higher the heat of melting (or fusion) and the heat of evaporation (or vaporization), the lower the percentage of volatiles in the finish required, and vice versa, where the primary mechanism is melting and evaporation of the finish. Similarly, the lower the thermal conductivity of the finish, the less the amount of finish required, and vice versa, where the primary mechanism is the low thermal conductivity of the finish.

A further feature of the airbag of the present invention is that the fabric comprising the airbag, by exhibiting some degree of permeability, enables the airbag to be constructed without deflation vent holes. Instead of using vent holes the inflation gases are dissipated through the surface of the airbag at a controlled rate. Since the permeability of the overall bag configuration will vary as a function of its surface area, a larger bag will necessarily allow more venting through its surface than a smaller bag. In conventional airbags made from coated fabrics as the size of the airbag varies the size of the vent holes have to be changed as well. It has been difficult to properly design the size of vent holes. Also, the elimination of vent holes eliminates the need for the construction of reinforcements around the vent holes to avoid tearing and results in a corresponding savings in cutting, securing and related fabrication costs.

To summarize, the present invention provides an uncoated woven fabric which is strong, lightweight, thin and flexible, yet has an extremely low permeability—namely, a permeability not higher than CFM—so as to render it suitable for use in airbags even according to proposed new standards. The present invention further comprises an airbag including a bag made of the fabric, a method of making the airbag, and an airbag made of an improved fabric having a finish to prevent flash point melting.

Now that the preferred embodiments of the present invention have been shown and described in detail, various modifications and improvements thereon will become readily apparent to those skilled in the art. Accordingly, the appended claims are to be construed broadly in a manner consistent with the spirit and scope of the invention herein.

We claim:

1. An airbag including a bag of strong, lightweight, thin, flexible fabric of low permeability comprising an uncoated woven cloth characterized by a permeability of not more than one cubic foot of air per minute per square foot of cloth (0.5 cm$^3$/sec/cm$^2$) at a pressure drop of 0.5 inch of water (1.27 cm) across the cloth.

2. The airbag of claim 1 wherein said fabric is further characterized by a Mullen burst strength of at least 650 psi (4482 kilopascals), a tensile strength of at least 300 lbs. (1334 newtons), a trapezoid tear of at least 40 lbs. (178 newtons), an elongation at break of at least 25%, a weight of not more than 8.25 oz/square yard (280 gm/m$^2$), and a thickness of less than 0.016 inch (0.041 cm).

3. The airbag of claim 1 wherein said cloth is woven in a 1×1 plain weave.

4. The airbag of claim 1 wherein said cloth is woven in a 2×2 basket weave.

5. The airbag of claim 1 wherein said cloth is woven about 51-52 ends/inch by about 43-52 picks/inch (20 ends/cm by 17-20 picks/cm.)

6. The airbag of claim 1 wherein said cloth is polyester.

7. The airbag of claim 1 wherein said cloth is woven of not greater than 600 denier multifilament yarn.

8. The airbag of claim 7 wherein said cloth is woven of 400-600 denier multifilament yarn.

9. The airbag of claim 8 wherein said cloth is woven from yarn having 100-300 filaments.

10. The airbag of claim 9 wherein said cloth is woven from polyester filament yarn.

11. The airbag of claim 1 wherein said cloth is calendered on both sides below its softening temperature.

12. The airbag of claim 1 additionally including a finish disposed on at least the surface of said cloth forming the interior of said bag to reduce flash point melting of said cloth.

13. The airbag of claim 12 wherein said finish is of low thermal conductivity.

14. The airbag of claim 12 wherein said finish includes volatiles.

15. An airbag including a bag of strong, lightweight, thin, flexible fabric of low permeability comprising an uncoated, woven, high strength, lightweight, thin, flexible cloth calendered on both sides below its softening temperature to reduce the permeability to not more than one cubic foot of air per minute per square foot of cloth (0.5 cm$^3$/sec/cm$^2$) at a pressure drop of 0.5 inch of water (1.27 cm) across the cloth.

16. An airbag including a bag of strong, lightweight, thin, flexible fabric of low permeability comprising an uncoated woven cloth of polyester calendered on both sides below its softening temperature to reduce the permeability to not more than one cubic foot of air per minute per square foot of cloth (0.5 cm$^3$/sec/cm$^2$) at a pressure drop of 0.5 inch of water (1.27 cm) across the cloth, and characterized by a Mullen burst strength of at least 650 psi (4482 kilopascals), a tensile strength of at least 300 lbs. (1334 newtons), a trapezoid tear of at least 40 lbs. (178 newtons), an elongation at break of at least 25%, a weight of not more than 8.25 oz/square yard (280 gm/m$^2$), and a thickness of less than 0.016 inch (0.041 cm), woven of 400-600 denier multifilament yarn, having 100-300 filaments per yarn bundle.

17. An airbag comprising a bag of a heat-resistant strong, lightweight, thin, flexible fabric of low permeability formed of
    (A) an uncoated woven cloth made from yarn and characterized by a permeability of not more than one cubic foot of air per minute per square foot of cloth (0.5 cm$^3$/sec/cm$^2$) at a pressure drop of 0.5 inch of water (1.27 cm) across the cloth; and
    (B) a finish disposed on at least the surface of said cloth forming the interior of said bag to reduce flash point melting of said cloth.

18. The airbag of claim 17 wherein said finish is of low thermal conductivity.

19. The airbag of claim 17 wherein said finish includes volatiles.

20. The airbag of claim 17 wherein said finish is an additive added to said cloth after weaving thereof.

21. The airbag of claim 17 wherein said finish is an additive added to said yarn prior to weaving of said cloth.

22. The airbag of claim 17 wherein said finish is a processing lubricant.

23. The airbag of claim 22 wherein said processing lubricant is a blend of mineral oil and at least one nonionic surfactant.

24. The airbag of claim 1 wherein said cloth is woven in a 2/1 twill weave.

25. The airbag of claim 1 constructed and arranged without vent holes.

26. The airbag of claim 15 constructed and arranged without vent holes.

27. The airbag of claim 16 constructed and arranged without vent holes.

28. The airbag of claim 17 constructed and arranged without vent holes.

29. A method of making an airbag including a bag of strong, lightweight, thin, flexible fabric of low permeability, comprising the steps of:
    (A) providing an uncoated, woven, strong, lightweight, thin, flexible cloth of high permeability; and
    (B) calendering the cloth on both sides below its softening temperature to reduce the permeability to not more than three cubic feet of air per minute per square foot of cloth (1.5 cm$^3$/sec/cm$^2$) at a pressure drop of 0.5 inch of water (1.27 cm) across the cloth.

* * * * *

REEXAMINATION CERTIFICATE (3680th)

United States Patent [19]
Thornton et al.

[11] B1 5,073,418
[45] Certificate Issued Dec. 8, 1998

[54] LOW PERMEABILITY FABRIC, AIRBAG MADE OF SAME AND METHOD OF MAKING SAME

[75] Inventors: Peter B. Thornton, Bronxville; Stanley H. Cone; George W. Booz, both of Hornell, all of N.Y.

[73] Assignee: Stern & Stern Industries, Inc., New York, N.Y.

Reexamination Request:
No. 90/004,668, Jun. 13, 1997

Reexamination Certificate for:
Patent No.: 5,073,418
Issued: Dec. 17, 1991
Appl. No.: 565,267
Filed: Aug. 9, 1990

Related U.S. Application Data

[63] Continuation-in-part of Ser. No. 264,158, Oct. 28, 1988, Pat. No. 4,977,016.

[51] Int. Cl.$^6$ .................................................. B60R 21/16
[52] U.S. Cl. .................... 428/34.9; 28/165; 38/144; 139/387 R; 139/389; 264/280; 280/743.1
[58] Field of Search ........................ 139/387 R, 389; 28/165; 38/144; 280/743.1; 428/36.1; 264/175, 280; 156/437

[56] References Cited

U.S. PATENT DOCUMENTS

| | | | |
|---|---|---|---|
| 3,937,488 | 2/1976 | Wilson et al. | 280/736 |
| 4,445,903 | 5/1984 | Minemura et al. | 8/492 |
| 4,582,747 | 4/1986 | Hiakawa et al. | 428/229 |
| 4,977,016 | 12/1990 | Thornton et al. | 428/225 |

FOREIGN PATENT DOCUMENTS

| | | |
|---|---|---|
| 974745 | 9/1975 | Canada. |
| 8714595 | 1/1988 | Germany. |
| 61-108771 (A) | 5/1986 | Japan. |

OTHER PUBLICATIONS

Krysiak, H.R., "Close Those Cloth Pores!", Textile Industries, Jan. 1968.
Jorder, Helmut Melliand Textilberichte 1974.
Morrison, Jim, "Police driving Lincolns now?", Dearborn Times–Hearld, (Mar. 12, 1981).
Foren, John, "Police to use Lincolns in order to test airbgs," Dearborn Press & Guide (Mar. 12, 1981).
"Testing Methods for Woven Fabrics," Japanese Industrial Standard; JIS L–1096.
Translation of Portion of JIS L–1018.
JIS L 1096—1990.
Ford Motor Co. Engineering Material Specification, No. VESB–M99H115–A.
Fisher Body Material Specification, FBMS 23–29, 1977.
Thiokal Specification, Code I.D. No. 07703, 1978.

*Primary Examiner*—James J. Bell

[57] ABSTRACT

An airbag includes a bag made of a strong, lightweight, thin, flexible fabric of low permeability comprising an uncoated woven cloth characterized by a permeability of not more than one cubic foot of air per minute per square foot of cloth (0.5 cm$^3$/sec/cm$^2$) at a pressure drop of 0.5 inch of water (1.27 cm) across the cloth. The cloth is calendered on both sides to reduce its permeability. The airbag may additionally include a finish of low thermal conductivity disposed on at least the surface of the cloth forming the interior of the bag.

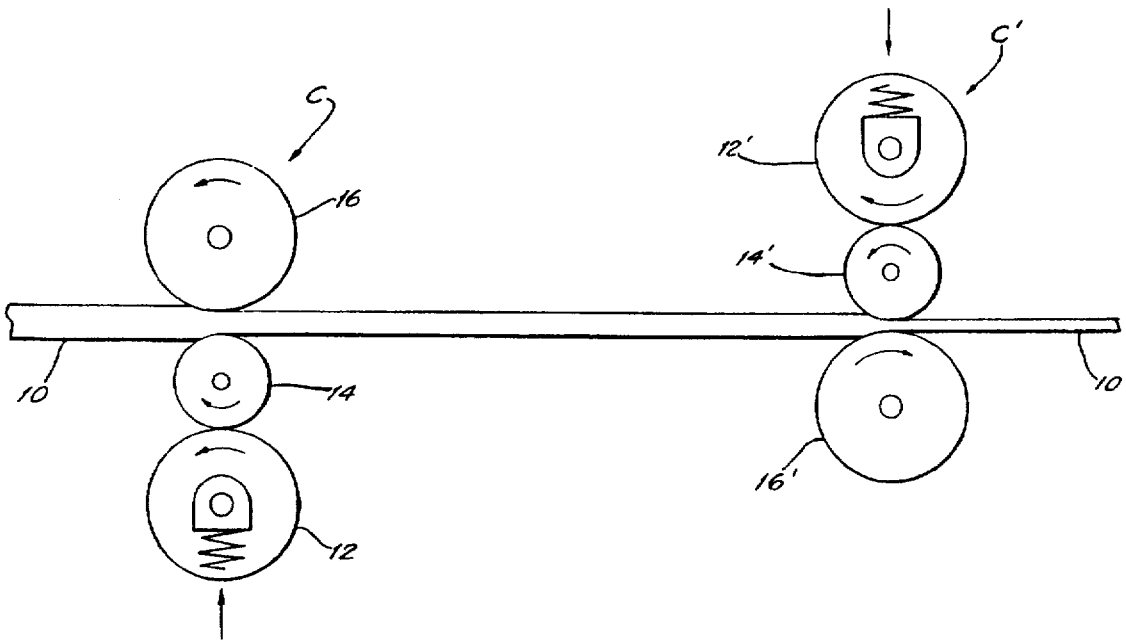

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–29 is confirmed.

* * * * *